(12) United States Patent
Duan et al.

(10) Patent No.: US 11,490,134 B2
(45) Date of Patent: Nov. 1, 2022

(54) METHOD AND SYSTEM FOR CODEC OF VISUAL FEATURE DATA

(71) Applicant: Peking University, Beijing (CN)

(72) Inventors: Lingyu Duan, Beijing (CN); Yihang Lou, Beijing (CN); Ziqian Chen, Beijing (CN); Yan Bai, Beijing (CN); Yicheng Huang, Beijing (CN); Tiejun Huang, Beijing (CN); Wen Gao, Beijing (CN)

(73) Assignee: Peking University, Beijing (CN)

( * ) Notice: Subject to any disclaimer, the term of this patent is extended or adjusted under 35 U.S.C. 154(b) by 305 days.

(21) Appl. No.: 16/652,270

(22) PCT Filed: Dec. 8, 2017

(86) PCT No.: PCT/CN2017/115269
§ 371 (c)(1),
(2) Date: Aug. 11, 2020

(87) PCT Pub. No.: WO2019/061836
PCT Pub. Date: Apr. 4, 2019

(65) Prior Publication Data
US 2021/0014540 A1    Jan. 14, 2021

(30) Foreign Application Priority Data
Sep. 30, 2017   (CN) .......................... 201710944751.2

(51) Int. Cl.
*H04N 21/2343*   (2011.01)
*H04N 21/4402*   (2011.01)
*H04N 21/643*    (2011.01)

(52) U.S. Cl.
CPC ..... *H04N 21/2343* (2013.01); *H04N 21/4402* (2013.01); *H04N 21/643* (2013.01)

(58) Field of Classification Search
CPC .......... H04N 21/2343; H04N 21/4402; H04N 21/643; G06V 20/40
See application file for complete search history.

(56) References Cited

U.S. PATENT DOCUMENTS

2007/0245400 A1 * 10/2007 Paek ...................... G06V 20/40
707/E17.028

FOREIGN PATENT DOCUMENTS

| CN | 1437408 A | 8/2003 |
| CN | 103856780 A | 6/2014 |

(Continued)

OTHER PUBLICATIONS

Search Report dated Jul. 27, 2018 received in International Patent Application No. PCT/CN2017/115269 together with an English language translation.

(Continued)

*Primary Examiner* — Yassin Alata
(74) *Attorney, Agent, or Firm* — Scully Scott Murphy & Presser (57) ABSTRACT

A method and system for codec of visual feature data is provided. First protocol format visual feature data generated by an intelligent front end and a certificate identity used to uniquely identify a corresponding first protocol format are received. The first protocol format visual feature data is converted to a same type of second protocol format visual feature data according to the certificate identity. The second protocol format visual feature data is received and parsed according to the second protocol format to obtain original visual feature data that are generated by the intelligent front end and contained in the first protocol format visual feature data.

12 Claims, 4 Drawing Sheets

(56) References Cited

FOREIGN PATENT DOCUMENTS

| CN | 104767997 A | 7/2015 |
|---|---|---|
| CN | 104767998 A | 7/2015 |
| CN | 106570910 A | 4/2017 |
| JP | H11-177845 A | 7/1999 |
| JP | H11-262005 A | 9/1999 |
| WO | 2015/198560 A1 | 12/2015 |

OTHER PUBLICATIONS

Notification of the First Office Action dated Apr. 29, 2019 received in Chinese Patent Application No. CN 201710944751.2 together with an English language translation.
Notification of the Second Office Action dated Jul. 18, 2019 received in Chinese Patent Application No. CN 201710944751.2 together with an English language translation.

* cited by examiner

METHOD AND SYSTEM FOR CODEC OF VISUAL FEATURE DATA

TECHNICAL FIELD

The present invention relates to the field of video processing. More specifically, the present invention relates to a method and a system for codec of visual feature data.

BACKGROUND

With the increasing popularity and application of cameras in the fields of intelligent transportation and security monitoring and the like, how to efficiently transfer video data collected by a large number of camera front ends to a server to save storage space and optimize video analysis process without affecting the result of video analysis has always been a problem of people's concern.

For example, in order to solve the above problem, many intelligent cameras have been developed by people. These intelligent cameras can extract visual feature data (for example, key frames, as well as textures, patterns and grayscale statistical features of images extracted from specific frames, which can affect the result of video analysis) in videos, and only transmit these visual feature data to the server. Since the amount of these visual feature data is much less than the amount of data of the original video stream, the amount of data that needs to be transmitted is greatly reduced, and the amount of data that needs to be stored on the server is also greatly reduced. Moreover, since feature extraction has been distributed to individual intelligent cameras for processing, a centralized processing operation performed at the server is avoided, thereby reducing the need to constantly upgrade the processing capacity of the server.

However, there are currently many manufacturers that can provide intelligent cameras. Due to the lack of a unified standard, the contents and formats (i.e., specifications) of the visual feature data extracted by the intelligent cameras of various manufacturers may be different. Moreover, in order to improve the performance of the product or meet new user requirements, the manufacturer is also likely to modify the content and format of the extracted visual feature data in a certain model of its camera. This requires the server to store and constantly update the different specifications used to describe the forms of visual feature data extracted by intelligent cameras of different models from different manufacturers or even the same manufacturer, so as to ensure that users can correctly perform video analysis through the server.

At least in order to avoid storing and constantly updating the different specifications used to describe the forms of visual feature data extracted by intelligent cameras of different models from different manufacturers or even the same manufacturer on the server, new technical solutions need to be proposed.

SUMMARY

The object of the present invention is achieved by the following technical solutions.

A method for codec of visual feature data includes:

step 1: receiving, by an encoder, visual feature data of at least one type of first protocol format generated by at least one type of intelligent front end, and at least one certificate identifier configured to uniquely identify the corresponding at least one type of first protocol format; and converting, by the encoder, the visual feature data of the at least one type of first protocol format generated by the at least one type of intelligent front end into visual feature data of a second protocol format of the same type, according to the at least one certificate identifier; and step 2: receiving, by a decoder, the visual feature data of the second protocol format, and performing parsing by the decoder according to the second protocol format to obtain at least one type of original visual feature data generated by the at least one type of intelligent front end and contained in the visual feature data of the at least one type of first protocol format.

According to the method for codec of visual feature data of the present invention, between step 1 and step 2, the method further includes:

step 1': encoding the visual feature data of the second protocol format into a visual feature data transmission code stream by the encoder; and step 2': receiving the visual feature data transmission code stream by the decoder, and decoding the visual feature data transmission code stream into visual feature data of the second protocol format by the decoder.

According to the method for codec of visual feature data of the present invention, before step 1, the method further includes:

step 3: registering, by the intelligent front end, an organization manner of the visual feature data of the first protocol format and its corresponding certificate identifier in the encoder.

According to the method for codec of visual feature data of the present invention, after step 3, the method further includes:

step 4: deleting one or more certificate identifiers and one or more organization manners of the visual feature data of the first protocol format corresponding to the one or more certificate identifiers by the encoder, or modifying one or more certificate identifiers and/or one or more organization manners of the visual feature data of the first protocol format by the encoder.

According to the method for codec of visual feature data of the present invention, after step 2, the method further includes:

at a user back end, performing search matching or identification on a set of feature descriptors contained in the original visual feature data having the same certificate identifier.

According to the method for codec of visual feature data of the present invention, step 1 includes:

step 1-1: receiving, by the encoder, the visual feature data of the at least one type of first protocol format generated by the at least one type of intelligent front end, and the at least one certificate identifier configured to uniquely identify the corresponding at least one type of first protocol format;

step 1-2: determining, by the encoder, at least one organization manner of the visual feature data of the at least one first protocol format according to the at least one certificate identifier;

step 1-3: extracting, by the encoder, at least one type of original visual feature data according to the at least one organization manner of the visual feature data of the at least one first protocol format; and step 1-4: encapsulating, by the encoder, the at least one type of original visual feature data according to the organization manner of visual feature data of a second protocol format to generate visual feature data of the second protocol format.

A system for codec of visual feature data includes:

an encoder, configured to receive visual feature data of at least one type of first protocol format generated by at least one type of intelligent front end, and at least one certificate identifier configured to uniquely identify the corresponding at least one type of first protocol format; and convert the visual feature data of the at least one type of first protocol format generated by the at least one type of intelligent front end into visual feature data of a second protocol format of the same type, according to the at least one certificate identifier; and a decoder, configured to receive the visual feature data of the second protocol format, and perform parsing according to the second protocol format to obtain at least one type of original visual feature data generated by the at least one type of intelligent front end and contained in the visual feature data of the at least one type of first protocol format.

According to the system for codec of visual feature data of the present invention:

the encoder is further configured to encode the visual feature data of the second protocol format into a visual feature data transmission code stream; and the decoder is further configured to receive the visual feature data transmission code stream, and decode the visual feature data transmission code stream into visual feature data of the second protocol format.

According to the system for codec of visual feature data of the present invention:

the encoder is further configured to delete one or more certificate identifiers and one or more organization manners of the visual feature data of the first protocol format corresponding to the one or more certificate identifiers, or modify one or more certificate identifiers and/or one or more organization manners of the visual feature data of the first protocol format.

According to the system for codec of visual feature data of the present invention, the system further includes:

an intelligent front end, configured to register an organization manner of the visual feature data of the first protocol format and its corresponding certificate identifier in the encoder.

According to the system for codec of visual feature data of the present invention, the system further includes:

a user back end, configured to perform search matching or identification on a set of feature descriptors contained in the original visual feature data having the same certificate identifier.

According to the system for codec of visual feature data of the present invention, the encoder includes:

a data receiving module, configured to receive the visual feature data of the at least one type of first protocol format generated by the at least one type of intelligent front end, and the at least one certificate identifier configured to uniquely identify the corresponding at least one type of first protocol format;

a first-protocol-format specification determination module, configured to determine at least one organization manner of the visual feature data of the at least one first protocol format according to the at least one certificate identifier;

an original visual feature data extraction module, configured to extract at least one type of original visual feature data according to the at least one organization manner of the visual feature data of the at least one first protocol format; and a second-protocol-format visual feature data generation module, configured to encapsulate the at least one type of original visual feature data according to the organization manner of visual feature data of a second protocol format to generate visual feature data of the second protocol format.

The advantage of the present invention is that it at least avoids storing different specifications for describing the organization manners of the visual feature data extracted by intelligent cameras of different models from different manufacturers or even the same manufacturer in the background such as the server and the like, and it is only required to store the specification of one protocol format in the background such as the server and the like. Moreover, a specification update operation on the server is also avoided.

BRIEF DESCRIPTION OF THE DRAWINGS

Upon reading the detailed description of the specific embodiments below, various other advantages and benefits will become clear to those skilled in the art. The drawings are only used for the purpose of illustrating the specific embodiments, and should not be considered as limiting the present invention. Moreover, the same reference signs are used throughout the drawings to indicate the same parts. In the drawings.

DETAILED DESCRIPTION

Hereinafter, exemplary embodiments of the present disclosure will be described in more detail with reference to the accompanying drawings. Although the exemplary embodiments of the present disclosure are shown in the drawings, it should be understood that the present disclosure may be implemented in various forms and should not be limited by the embodiments set forth herein. Rather, these embodiments are provided to enable a more thorough understanding of the present disclosure and to fully convey the scope of the present disclosure to those skilled in the art.

Figure 1:
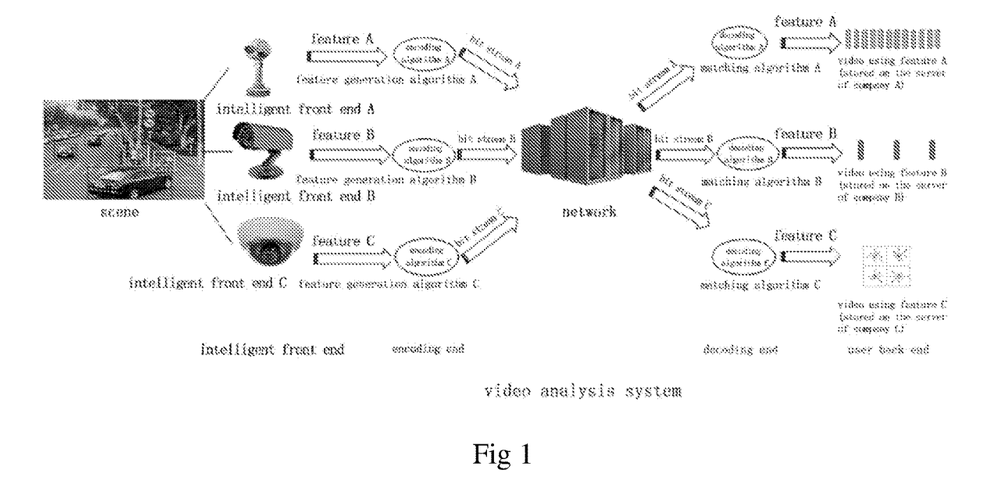
FIG. 1 shows a schematic view of a first system for codec of visual feature data in the related art.

FIG. 1 shows a schematic view of a first system 100 for codec of visual feature data in the related art.

As shown in FIG. 1, the system for codec of visual feature data (i.e., a video analysis system) 100 uses intelligent front ends (i.e., intelligent cameras produced by different manufacturers) A-C to capture videos of a scene and uses feature generation algorithms A-C (for example, defined by different manufacturers of intelligent camera) separately to generate features A-C. Then, the features A-C are sent separately to an encoding end for encoding. The encoding end uses encoding algorithms A-C separately to encode the features A-C and generate bit streams A-C, and sends the bit streams A-C to a decoding end through network. The decoding end uses decoding algorithms A-C separately to decode the bit streams A-C and obtain the features A-C, and sends the features A-C to a user back end. The user back end uses matching algorithms A-C separately to analyze videos which are stored on servers of different companies (company A, company B, or company C) and which use the same certain feature (feature A, feature B, or feature C).

Although the intelligent front end and the encoding end are shown as two separate devices in FIG. 1, the intelligent front end and the encoding end may also be a single integrally combined device. Similarly, although the decoding end and the user back end are shown as two separate devices in FIG. 1, the decoding end and the user back end may also be a single integrally combined device.

The advantage of the system 100 for codec of visual feature data shown in FIG. 1 is that it enables products of different manufacturers of intelligent front ends, which use customized different contents and formats (i.e., specifications) of visual feature data, to be conveniently connected to the system. However, as described in the section of background, the problem with this solution is that the decoding end and the user back end need to store and constantly update the different specifications used to describe the forms of visual feature data extracted by intelligent cameras of different models from different manufacturers or even the same manufacturer so as to ensure a normal operation of the entire system, which is not advantageous for the maintenance and upgrade of the system.

Figure 2:
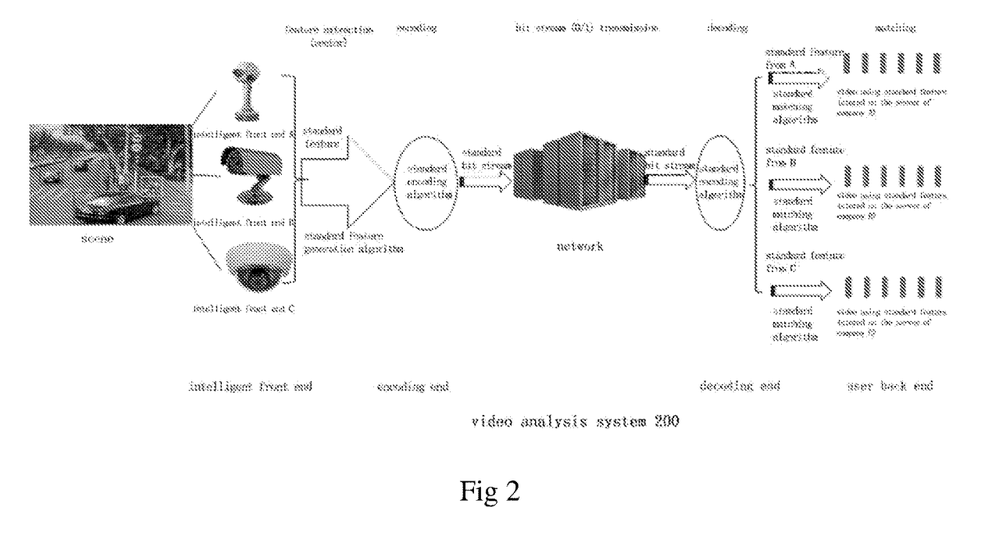
FIG. 2 shows a schematic view of a second system for codec of visual feature data in the related art.

FIG. 2 shows a schematic view of a second system 200 for codec of visual feature data in the related art.

As shown in FIG. 2, the system for codec of visual feature data (i.e., a video analysis system) 200 uses intelligent front ends A-C (i.e., intelligent cameras produced by different manufacturers) to capture videos of different scenes and separately uses a standard feature generation algorithm defined within the same standard (e.g., a standard re-defined based on the related art), i.e., an algorithm generated by the same feature defined within the standard, to generate standard features that meet the same standard (i.e., visual features which are defined by the same standard, correspond to the above standard feature generation algorithm, and have the same organizational manner). Then, the standard features that meet the same standard are sent to an encoding end for encoding. The encoding end uses a standard encoding algorithm defined within the same standard (i.e., the same algorithm for encoding features and defined within the standard, and only for encoding the standard features) to encode features that meet the same standard and generate standard bit streams that meet the same standard (i.e., bit streams which are defined by the same standard, correspond to the above standard encoding algorithm, and have the same form), and sends the standard bit streams that meet the same standard to a decoding end through network. The decoding end uses a standard decoding algorithm defined by the same standard and corresponding to the above standard encoding algorithm (i.e., the same algorithm for decoding bit streams and defined within the standard, and only for standard bit streams) to decode the bit streams to respectively obtain standard features that meet the same above standard and come from the intelligent front ends A-C, and sends these features to a user back end. The user back end uses a standard matching algorithm defined by the same standard (i.e., a visual feature matching algorithm defined by the same standard and corresponding to the above standard feature generation algorithm, and only for the standard features) to analyze videos stored on the server of a certain company (company A, company B, or company C).

Similar to the technical solution of FIG. 1, although the intelligent front end and the encoding end are shown as two separate devices in FIG. 2, the intelligent front end and the encoding end may also be a single integrally combined device. Likewise, although the decoding end and the user back end are shown as two separate devices in FIG. 2, the decoding end and the user back end may also be a single integrally combined device.

The advantage of the system 200 for codec of visual feature data shown in FIG. 2 is that it only supports intelligent front ends that use the same unified content and format (i.e., specification) of visual feature data, which is advantageous for the maintenance and upgrade of the system. However, the problem with this solution is that there are regulatory constraints on the manufacturers of intelligent front ends, which limits their enthusiasm for production and is not advantageous for the development of the industry.

At least to solve the problem of the system 100 for codec of visual feature data shown in FIG. 1, and also in order to promote the fusion between the system 100 for codec of visual feature data shown in FIG. 1 and the system 200 for codec of visual feature data shown in FIG. 2, the present invention proposes the following technical solutions.

Figure 3:
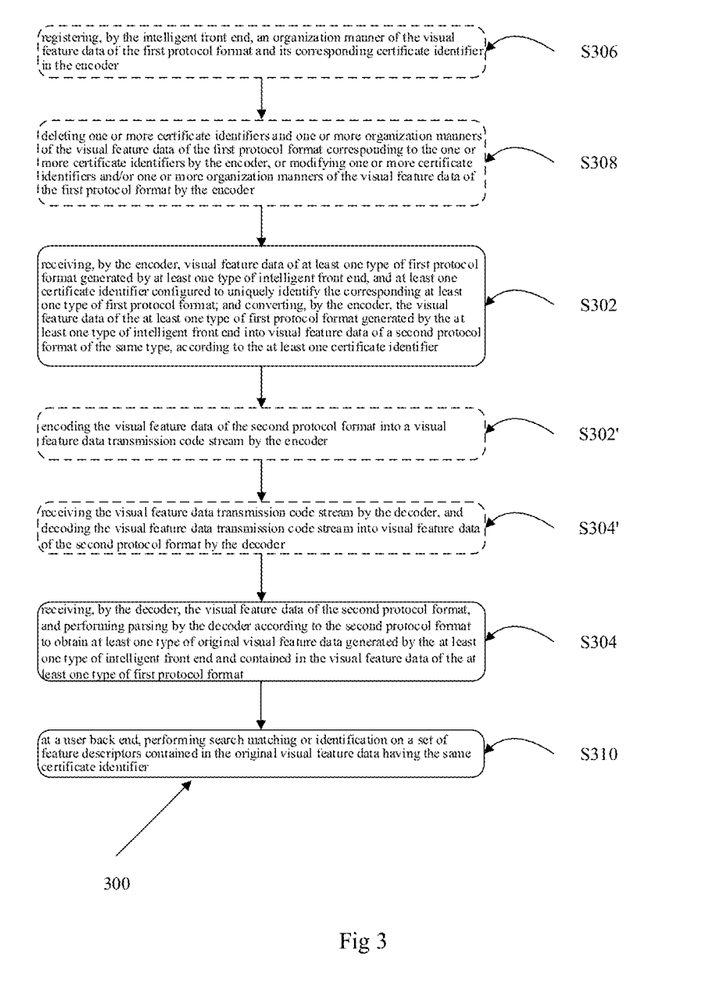
FIG. 3 shows a schematic flowchart of a method for codec of visual feature data according to an embodiment of the present invention.

FIG. 3 shows a schematic flowchart of a method 300 for codec of visual feature data according to an embodiment of the present invention.

As shown by the solid-line boxes in FIG. 3, the method 300 for codec of visual feature data includes the following steps.

Step S302: receiving, by an encoder, visual feature data of at least one type of first protocol format generated by at least one type of intelligent front end, and at least one certificate identifier configured to uniquely identify the corresponding at least one type of first protocol format; and converting, by the encoder, the visual feature data of the at least one type of first protocol format generated by the at least one type of intelligent front end into visual feature data of a second protocol format of the same type, according to the at least one certificate identifier.

For example, the first protocol format (specification) may be one of the protocol formats customized by different manufacturers of intelligent front ends (e.g., the protocol formats for defining the features A-C, the encoding algorithms A-C of the bit streams A-C, and the decoding algorithms A-C of the bit streams A-C in the system 100 for codec of visual feature data shown in FIG. 1), or may be a unified standard used in the system 200 for codec of visual feature data (e.g., a standard re-defined based on the related art), etc.

The certificate identifier of the first protocol format is configured to uniquely identify the first protocol format. For example, a certificate identifier A-1 may be configured to identify a protocol format 1 defined by manufacturer A of the intelligent front ends, a certificate identifier A-2 may be configured to identify a protocol format 2 defined by the manufacturer A of the intelligent front ends, a certificate identifier B may be configured to identify a protocol format defined by manufacturer B of the intelligent front ends, a certificate identifier C may be configured to identify a protocol format defined by manufacturer C of the intelligent front ends, and a certificate identifier UNI may be configured to identify the protocol format used in the unified standard used in the system 200 for codec of visual feature data.

For example, the second protocol format (specification) may be a more general unified protocol format that contains the definitions of all the fields of all the above-mentioned first protocol formats (specifications).

Step S304: receiving, by a decoder, the visual feature data of the second protocol format, and performing parsing by the decoder according to the second protocol format to obtain at least one type of original visual feature data generated by the at least one type of intelligent front end and contained in the visual feature data of the at least one type of first protocol format.

Since the second protocol format (specification) contains the definitions of all the fields of all the above-mentioned first protocol formats (specification), the data of original fields extracted from the visual feature data of all the first protocol formats by the decoder (or data obtained after a data conversion operation performed on the data of original fields, such as a shift operation) can be stored in the corresponding fields of the second protocol format, thereby generating visual feature data of the second protocol format that can be decoded using a standard feature decoding algorithm.

Optionally, as shown by the dotted-line boxes in FIG. 3, the method 300 for codec of visual feature data may further include the following steps between step S302 and step S304.

Step S302': encoding the visual feature data of the second protocol format into a visual feature data transmission code stream by the encoder.

For example, the encoding method adopted by the encoder (i.e., the encoding end) is a source encoding algorithm capable of generating a standard transmission code stream.

Step S304': receiving the visual feature data transmission code stream by the decoder, and decoding the visual feature data transmission code stream into visual feature data of the second protocol format by the decoder.

For example, the decoding method adopted by the decoder (i.e., the decoding end) is a source decoding algorithm capable of decoding the above standard transmission code stream.

Optionally, as shown by the dotted-line boxes in FIG. 3, the method 300 for codec of visual feature data may further include the following step before step S302.

Step S306: registering, by the intelligent front end, an organization manner of the visual feature data of the first protocol format and its corresponding certificate identifier in the encoder.

For example, before step S302 is executed for the first time, step S306 needs to be executed to ensure the correct execution of the method 300 for codec of visual feature data. The registration of the organization manner of the visual feature data of the first protocol format and its corresponding certificate identifier only needs to be performed once.

Optionally, the specific field information of the second protocol format (i.e., the organization manner of the visual feature data) may be registered in the encoder. The registration of the organization manner of the visual feature data of the second protocol format only needs to be performed once.

Optionally, as shown by the dotted-line box in FIG. 3, the method 300 for codec of visual feature data may further include the following step after step S306.

Step S308: deleting one or more certificate identifiers and one or more organization manners of the visual feature data of the first protocol format corresponding to the one or more certificate identifiers by the encoder, or modifying one or more certificate identifiers and/or one or more organization manners of the visual feature data of the first protocol format by the encoder.

For example, when the visual feature data of the first protocol format used by a certain type of camera no longer exists in the system, the encoder may delete the certificate identifier used by this type of camera and the organization manner of the visual feature data of the first protocol format corresponding to the certificate identifier so as to save storage space. If the manufacturer of intelligent front ends modified the organization manner of the visual feature data of the first protocol format used by an existing certain type of camera, the organization manner of the visual feature data of the first protocol format corresponding to the certificate identifier may be modified on the encoder.

Optionally, as shown by the dotted-line boxes in FIG. 3, the method 300 for codec of visual feature data may further include the following step after step S308.

Step S310: at a user back end, performing visual analysis such as search matching or identification on a set of feature descriptors contained in the original visual feature data having the same certificate identifier.

That is, the user back end may perform visual analysis on the data of multiple images or multiple videos from which the same feature is extracted.

Figure 4:
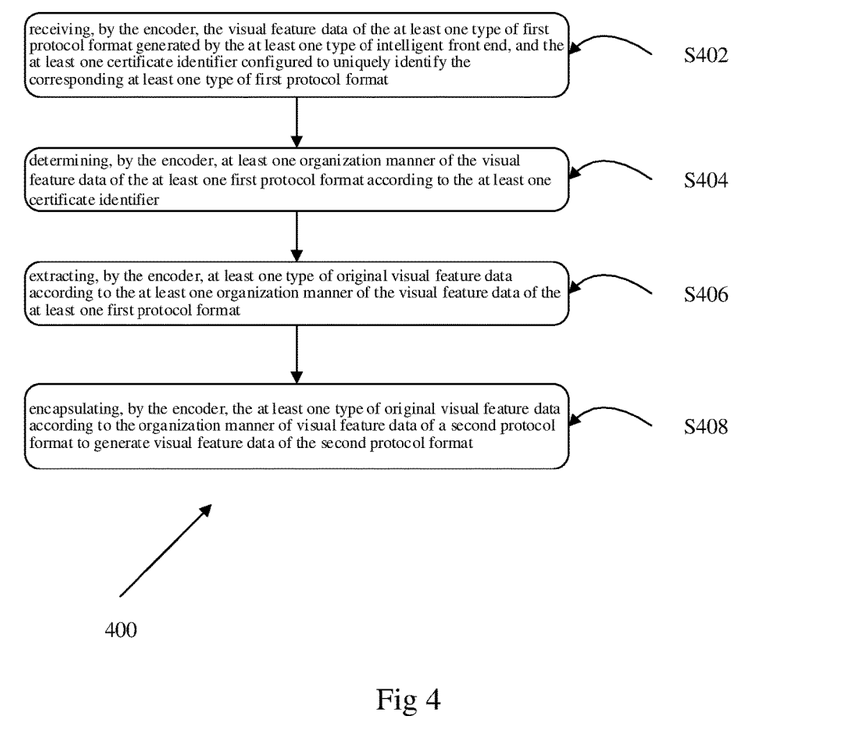
FIG. 4 shows a schematic flowchart of an encoding method in a method for codec of visual feature data according to an embodiment of the present invention.

FIG. 4 shows a schematic flowchart of an encoding method 400 in a method 300 for codec of visual feature data according to an embodiment of the present invention.

As shown in FIG. 4, the encoding method 400 in the method 300 for codec of visual feature data includes the following steps.

Step S402: receiving, by the encoder, the visual feature data of the at least one type of first protocol format generated by the at least one type of intelligent front end, and the at least one certificate identifier configured to uniquely identify the corresponding at least one type of first protocol format.

For example, the first protocol format (specification) may be one of the protocol formats customized by different manufacturers of intelligent front ends (e.g., the protocol formats for defining the features A-C, the encoding algorithms A-C of the bit streams A-C, and the decoding algorithms A-C of the bit streams A-C in the system 100 for codec of visual feature data shown in FIG. 1), or may be a unified standard used in the system 200 for codec of visual feature data (e.g., a standard re-defined based on the related art), etc.

The certificate identifier of the first protocol format is configured to uniquely identify the first protocol format. For example, a certificate identifier A-1 may be configured to identify a protocol format 1 defined by manufacturer A of the intelligent front ends, a certificate identifier A-2 may be configured to identify a protocol format 2 defined by the manufacturer A of the intelligent front ends, a certificate identifier B may be configured to identify a protocol format defined by manufacturer B of the intelligent front ends, a certificate identifier C may be configured to identify a protocol format defined by manufacturer C of the intelligent front ends, and a certificate identifier UNI may be configured to identify the protocol format used in the unified standard used in the system 200 for codec of visual feature data.

Step S404: determining, by the encoder, at least one organization manner of the visual feature data of the at least one first protocol format according to the at least one certificate identifier.

For example, the specific field information of the first protocol format (i.e., the organizational manner of the visual feature data) may include field information such as feature generation algorithm fields of the visual feature, key frame number fields, dimension fields of the visual feature, and data fields of the visual feature, as well as the location information of each field.

Step S406: extracting, by the encoder, at least one type of original visual feature data according to the at least one organization manner of the visual feature data of the at least one first protocol format.

For example, respective original field data corresponding to fields such as the feature generation algorithm fields of the visual feature, the key frame number fields, the dimension fields of the visual feature, and the data fields of the visual feature may be extracted according to the specific field information of the first protocol format.

Step S408: encapsulating, by the encoder, the at least one type of original visual feature data according to the organization manner of visual feature data of a second protocol format to generate visual feature data of the second protocol format.

For example, the second protocol format (specification) may be a more general unified protocol format that contains the definitions of all the fields of all the above-mentioned first protocol formats (specifications). Therefore, the data of original fields extracted from the visual feature data of all the first protocol formats by the decoder (or data obtained after a data conversion operation performed on the data of original fields, such as a shift operation) can be stored in the corresponding fields of the second protocol format, thereby generating visual feature data of the second protocol format that can be decoded using a standard feature decoding algorithm.

Figure 5:
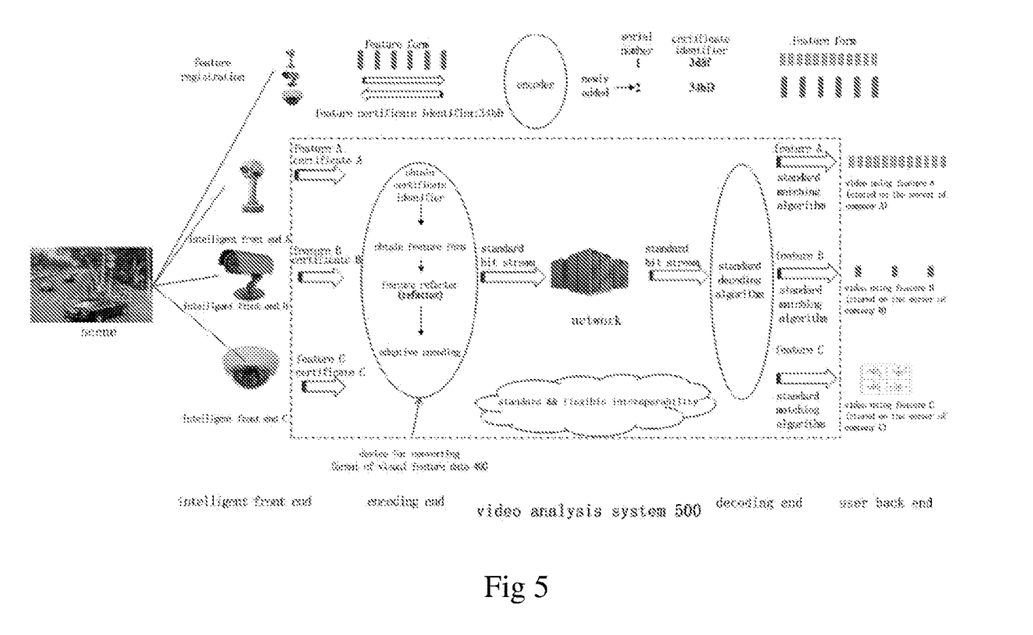
FIG. 5 shows a schematic view of a system for codec of visual feature data according to an embodiment of the present invention.

FIG. 5 shows a schematic view of a system 500 for codec of visual feature data according to an embodiment of the present invention.

As shown in FIG. 5, the system for codec of visual feature data (i.e., a video analysis system) 500 uses intelligent front ends (i.e., intelligent cameras produced by different manufacturers) A-C to capture videos of a scene and uses feature generation algorithms A-C (for example, defined by different manufacturers of intelligent camera) separately to generate features A-C. Then, the features A-C are sent separately to an encoding end.

Figure 6:
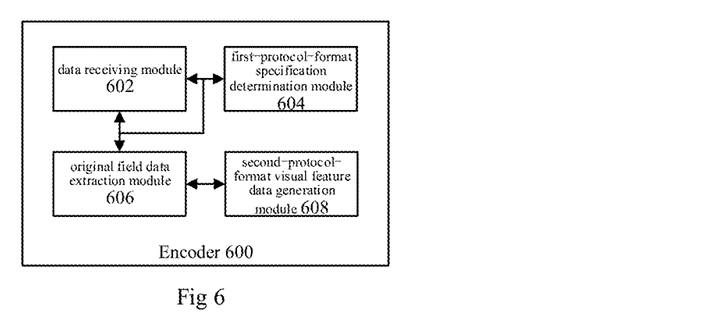
FIG. 6 shows a schematic block diagram of an encoder in a system for codec of visual feature data according to an embodiment of the present invention.

The system 500 for codec of visual feature data differs from the system 100 for codec of visual feature data shown in FIG. 1 in that the encoding end of the system 500 includes an encoder 600 shown in FIG. 6.

As shown in FIG. 5, the system 500 for codec of visual feature data includes an encoder (i.e., the encoding end) and a decoder (i.e., the decoding end).

The encoder (i.e., the encoding end) is configured to receive visual feature data of at least one type of first protocol format generated by at least one type of intelligent front end, and at least one certificate identifier configured to uniquely identify the corresponding at least one type of first protocol format; and convert the visual feature data of the at least one type of first protocol format generated by the at least one type of intelligent front end into visual feature data of a second protocol format of the same type, according to the at least one certificate identifier.

That is, the encoding end converts the format of the visual feature data (i.e., the visual feature data of the first protocol format) for features A-C to generate visual feature data of the second protocol format.

The decoder (i.e., the decoding end) is configured to receive the visual feature data of the second protocol format, and perform parsing according to the second protocol format to obtain at least one type of original visual feature data generated by the at least one type of intelligent front end and contained in the visual feature data of the at least one type of first protocol format.

That is, the decoding end receives the visual feature data of the second protocol format and extracts features A-C from it.

Optionally, the encoder is further configured to encode the visual feature data of the second protocol format into a visual feature data transmission code stream; and the decoder is further configured to receive the visual feature data transmission code stream, and decode the visual feature data transmission code stream into visual feature data of the second protocol format.

That is, the encoding end may also encode the second protocol format into a visual feature data transmission code stream (i.e., a standard bit stream), and send the standard bit stream to the decoding end through network. Correspondingly, the decoding end is further configured to receive the visual feature data transmission code stream (i.e., the standard bit stream), and extract the visual feature data of the second protocol format therefrom.

Optionally, the encoder is further configured to delete one or more certificate identifiers and one or more organization manners of the visual feature data of the first protocol format corresponding to the one or more certificate identifiers, or modify one or more certificate identifiers and/or one or more organization manners of the visual feature data of the first protocol format.

As shown in FIG. 5, the system 500 for codec of visual feature data may further include an intelligent front end.

The intelligent front end is configured to register an organization manner of the visual feature data of the first protocol format and its corresponding certificate identifier in the encoder. That is, the intelligent front end may send certificates A-C configured to identify the features A-C to the encoding end for registration.

As shown in FIG. 5, the system 500 for codec of visual feature data may further include a user back end.

The user back end is configured to perform search matching or identification on a set of feature descriptors contained in the original visual feature data having the same certificate identifier.

The system 500 for codec of visual feature data differs from the system 100 for codec of visual feature data shown in FIG. 1 in that the decoding end of the system 500 is similar to the decoding end of the system 200 for codec of visual feature data shown in FIG. 2 and it may also use the decoding algorithm defined by the same standard (i.e., the second protocol format) to decode the standard bit stream. However, differently, the decoding end of the system 500 for codec of visual feature data can obtain the features A-C from the intelligent front ends A-C respectively according to the second protocol format, and send the features A-C to the user back end. The user back end may use standard matching algorithms separately to analyze videos which are stored on servers of different companies (company A, company B, or company C) and which use the same certain feature (feature A, feature B, or feature C).

Although the intelligent front end and the encoding end are shown as two separate devices in FIG. 5, the intelligent front end and the encoding end may also be a single integrally combined device. Similarly, although the decoding end and the user back end are shown as two separate devices in FIG. 5, the decoding end and the user back end may also be a single integrally combined device.

FIG. 6 shows a schematic block diagram of an encoder 600 in the system 500 for codec of visual feature data according to the embodiment of the present invention.

As shown in FIG. 6, the encoder 600 in the system 500 for codec of visual feature data includes a data receiving module 602, a first-protocol-format specification determination module 604, an original field data extraction module 606, and a second-protocol-format visual feature data generation module 608.

The data receiving module 602 is configured to receive the visual feature data of the at least one type of first protocol format generated by the at least one type of intelligent front end, and the at least one certificate identifier configured to uniquely identify the corresponding at least one type of first protocol format.

That is, the data receiving module 602 can complete the operation of "obtaining a certificate identifier" performed in the encoder as shown in FIG. 5.

For example, the first protocol format (specification) may be one of the protocol formats customized by different manufacturers of intelligent front ends (e.g., the protocol formats for defining the features A-C, the encoding algorithms A-C of the bit streams A-C, and the decoding algorithms A-C of the bit streams A-C in the system 100 for codec of visual feature data shown in FIG. 1), or may be a unified standard used in the system 200 for codec of visual feature data (e.g., a standard re-defined based on the related art), etc.

The certificate identifier of the first protocol format is configured to uniquely identify the first protocol format. For example, a certificate identifier A-1 may be configured to identify a protocol format 1 defined by manufacturer A of the intelligent front ends, a certificate identifier A-2 may be configured to identify a protocol format 2 defined by the manufacturer A of the intelligent front ends, a certificate identifier B may be configured to identify a protocol format defined by manufacturer B of the intelligent front ends, a certificate identifier C may be configured to identify a protocol format defined by manufacturer C of the intelligent front ends, and a certificate identifier UNI may be configured to identify the protocol format used in the unified standard used in the system 200 for codec of visual feature data.

The first-protocol-format specification determination module 604 is configured to determine at least one organization manner of the visual feature data of the at least one first protocol format according to the at least one certificate identifier.

That is, the first-protocol-format specification determination module 604 can complete the operation of "obtaining the feature form" performed in the encoder as shown in FIG. 5.

For example, the specific field information of the first protocol format (i.e., the organizational manner of the visual feature data) may include field information such as feature generation algorithm fields of the visual feature, key frame number fields, dimension fields of the visual feature, and data fields of the visual feature, as well as the location information of each field.

The original field data extraction module 606 and the second-protocol-format visual feature data generation module 608 can jointly complete the operation of "feature refactor" performed in the encoder as shown in FIG. 5.

The original field data extraction module 606 is configured to extract at least one type of original visual feature data according to the at least one organization manner of the visual feature data of the at least one first protocol format. That is, the original field data extraction module 606 may extract respective original field data corresponding to fields such as the feature generation algorithm fields of the visual feature, the key frame number fields, the dimension fields of the visual feature, the data fields of the visual feature and the number fields of target objects based on the specific field information of the first protocol format (i.e., the field set, including the field name, occupied start bit position, etc.). The second-protocol-format visual feature data generation module 608 is configured to encapsulate the at least one type of original visual feature data according to the organization manner of visual feature data of a second protocol format to generate visual feature data of the second protocol format.

More specifically, for example, the original field data extraction module 606 may receive a set of visual feature descriptors (i.e., visual feature data of a certain first protocol format) of a plurality of target objects, which is generated based on visual search compact descriptors (CDVS), and extract respective original field data (i.e., at least one type of original visual feature data) corresponding to fields such as the feature generation algorithm fields of the visual feature, the key frame number fields, the dimension fields of the visual feature, the data fields of the visual feature and the number fields of target objects according to information such as the dimension fields of the visual feature corresponding to the registration certificate thereof (i.e., certificate identifier) (i.e., the field set corresponding to the certificate identifier, or the organization manner of visual feature data of the first protocol format corresponding to the certificate identifier). The second-protocol-format visual feature data generation module 608 reorganizes the set of descriptors of the original visual feature into a set of descriptors of the visual feature of the second protocol format (i.e., the visual feature data of the second protocol format).

That is, for the received set of visual feature descriptors, the original field data extraction module 606 may, according to the field set information, do statistics on information including feature type (i.e., feature generation algorithm), feature dimension, and the number of target objects, etc., and split the single set of visual feature descriptors originally encapsulated by the first protocol format into multiple sub-sets of target object feature descriptors, which have the same number as the target objects. In the set of feature descriptors of each target object, the coordinates and category of the target object in the set of descriptors of the original visual feature may be additionally marked (that is, one or more fields additionally added in the second protocol format are used). Then, the second-protocol-format visual feature data generation module 608 may arrange the object feature descriptors of the target object in a hierarchical manner according to the type of the object feature (i.e., arrange the data according to the second protocol format). Finally, the received set of descriptors of visual feature (of the first protocol format or feature) is converted into a set of descriptors of object feature (of the second protocol format or feature) in a standard organization manner.

Similarly, the original field data extraction module 606 may also receive a set of visual feature descriptors of a single target object based on Handcrafted features (e.g., scale-invariant feature transform (SIFT)). However, when the second-protocol-format visual feature data generation module 608 reorganizes the set of descriptors of the original visual feature into a set of descriptors of the visual feature of the second protocol format, only a very small sub-set of the set of descriptors of the visual feature of the second protocol format is used.

Similarly, the original field data extraction module 606 may also receive multiple sets of visual feature descriptors of a single target object generated based on depth features (such as R-MAC features, namely Regional Maximum Activation of Convolutions features; or NIP features, namely Nested Invariance Pooling features). However, when the second-protocol-format visual feature data generation module 608 reorganizes the set of descriptors of the original visual feature into a set of descriptors of the visual feature of the second protocol format, it sequentially fills in the set of visual feature descriptors of one object based on the size and dimensional information of the target object feature to form the second protocol feature.

Vice versa, for example, the original field data extraction module 606 may also combine multiple sets of visual feature descriptors of a single target object of the first protocol format into one set of descriptors of object feature of the second protocol format. Then, the second-protocol-format visual feature data generation module 608 may sequentially fill in (i.e., arrange the data according to the second protocol format) based on the size and dimensional information of the target object feature to form the data of the second protocol format.

Optionally, after the second-protocol-format visual feature data generation module 608 generates the visual feature data of the second protocol format, as described above with respect to the system 500 for codec of data, the encoder may also encode the visual feature data of the second protocol format (for example, through the "adaptive encoding" method shown in FIG. 5) into the visual feature data transmission code stream (that is, the "standard bit stream" shown in FIG. 5), and then transmit it on the network.

For example, after the visual feature data of the second protocol format is generated based on the construction method of the second protocol format or feature, a de-redundancy operation may also be performed in the encoder by using a technique such as arithmetic coding, coordinate compression and the like. That is, the "adaptive encoding" shown in FIG. 5 may include source coding.

Correspondingly, the decoding end may also include source decoding, or "adaptive decoding" corresponding to the "adaptive encoding" shown in FIG. 5 to decompress the data, thereby obtaining the visual feature data of the second protocol format before the encoding.

For example, the second protocol format (specification) may be a more general unified protocol format that contains the definitions of all the fields of all the above-mentioned first protocol formats (specifications), that is, a set of descriptors of visual feature of a general second protocol format. Therefore, the data of original fields extracted from the visual feature data of all the first protocol formats (or data obtained after a data conversion operation performed on the data of original fields, such as a shift operation) can be stored in the corresponding fields of the second protocol format, thereby generating visual feature data of the second protocol format that can be decoded using a standard feature decoding algorithm.

When encoding the data of original fields extracted from the visual feature data of the first protocol formats by using the set of descriptors of visual feature of this general second protocol format, the length of the required encoding may also be calculated based on the certificate identifiers, the number of objects, and the number and dimensions of object feature descriptors in the set, and the head or tail of the generated standard bit stream to be transmitted may be marked. At the same time, each feature descriptor of each object is encoded and converted into a bit stream, and the bit streams are spliced or split to form a standard bit stream, according to the number and length of the feature descriptors of their objects; finally, one or more standard bit streams of one or more objects generated by one set of visual feature descriptor of the second protocol format are combined to generate a standard bit stream to be transmitted for transmission. That is, the "adaptive encoding" shown in FIG. 5 may also include encoding of the above-mentioned standard bit stream.

Correspondingly, the decoding end may also decode according to information of the set (such as the certificate identifiers, the number of objects, and the number and dimensions of object feature descriptors) marked in the received standard bit stream, finally generate a set of visual feature descriptors of the second protocol format after combination, and then convert it into a set of visual feature descriptors of the first protocol format for visual feature analysis.

Although the above technical solution is described as a system for codec of visual feature data in a specific network form, those skilled in the art may conceive of a system for codec of network visual feature data or a system for codec of stand-alone visual feature data in other connection forms implemented in combination with the encoder 600.

According to the above technical solutions of the present invention, at least the problem of storing different specifications for describing the forms of the visual feature data extracted by intelligent cameras of different models from different manufacturers or even the same manufacturer in the background such as the server and the like, which exists in the system 100 for codec of visual feature data shown in FIG. 1, can be solved, and it is only required to store the specification of one protocol format in the background such as the server and the like. Moreover, a specification update operation on the decoding end or user back end is also avoided. At the same time, the fusion between the system 100 for codec of visual feature data shown in FIG. 1 and the system 200 for codec of visual feature data shown in FIG. 2 is also promoted.

Described above are only the specific exemplary embodiments of the present invention, but the scope of protection of the present invention is not limited thereto. The changes or replacements that can be easily conceived by any person skilled in the art within the technical scope disclosed by the present invention should be covered within the scope of protection of the present invention. Therefore, the scope of protection of the present invention shall be determined by the scope of protection of the claims.

The invention claimed is:

1. A method for codec of visual feature data, comprising:
    step 1: receiving, by an encoder, visual feature data of at least one type of first protocol format generated by at least one type of intelligent front end, and at least one certificate identifier configured to uniquely identify the corresponding at least one type of first protocol format; and
    converting, by the encoder, the visual feature data of the at least one type of first protocol format generated by the at least one type of intelligent front end into visual feature data of a second protocol format of the same type, according to the at least one certificate identifier; and
    step 2: receiving, by a decoder, the visual feature data of the second protocol format, and performing parsing by the decoder according to the second protocol format to obtain at least one type of original visual feature data generated by the at least one type of intelligent front end and contained in the visual feature data of the at least one type of first protocol format.

2. The method for codec of visual feature data according to claim 1, wherein between step 1 and step 2, the method further comprises:

step 1': encoding the visual feature data of the second protocol format into a visual feature data transmission code stream by the encoder; and step 2': receiving the visual feature data transmission code stream by the decoder, and decoding the visual feature data transmission code stream into visual feature data of the second protocol format by the decoder.

3. The method for codec of visual feature data according to claim 1, wherein before step 1, the method further comprises:

step 3: registering, by the intelligent front end, an organization manner of the visual feature data of the first protocol format and its corresponding certificate identifier in the encoder.

4. The method for codec of visual feature data according to claim 3, wherein after step 3, the method further comprises:

step 4: deleting at least one certificate identifier and at least one organization manner of the visual feature data of the first protocol format corresponding to the one or more certificate identifiers by the encoder, or modifying said at least one certificate identifier and said at least one organization manner of the visual feature data of the first protocol format by the encoder.

5. The method for codec of visual feature data according to claim 1, wherein after step 2, the method further comprises:

at a user back end, performing search matching or identification on a set of feature descriptors contained in the original visual feature data having the same certificate identifier.

6. The method for codec of visual feature data according to claim 3, wherein step 1 comprises:

step 1-1: receiving, by the encoder, the visual feature data of the at least one type of first protocol format generated by the at least one type of intelligent front end, and the at least one certificate identifier configured to uniquely identify the corresponding at least one type of first protocol format;

step 1-2: determining, by the encoder, at least one organization manner of the visual feature data of the at least one first protocol format according to the at least one certificate identifier;

step 1-3: extracting, by the encoder, at least one type of original visual feature data according to the at least one organization manner of the visual feature data of the at least one first protocol format; and step 1-4: encapsulating, by the encoder, the at least one type of original visual feature data according to the organization manner of visual feature data of a second protocol format to generate visual feature data of the second protocol format.

7. A system for codec of visual feature data, comprising:
an encoder, configured to receive visual feature data of at least one type of first protocol format generated by at least one type of intelligent front end, and at least one certificate identifier configured to uniquely identify the corresponding at least one type of first protocol format; and convert the visual feature data of the at least one type of first protocol format generated by the at least one type of intelligent front end into visual feature data of a second protocol format of the same type, according to the at least one certificate identifier; and a decoder, configured to receive the visual feature data of the second protocol format, and perform parsing according to the second protocol format to obtain at least one type of original visual feature data generated by the at least one type of intelligent front end and contained in the visual feature data of the at least one type of first protocol format.

8. The system for codec of visual feature data according to claim 7, wherein:

the encoder is further configured to encode the visual feature data of the second protocol format into a visual feature data transmission code stream; and the decoder is further configured to receive the visual feature data transmission code stream, and decode the visual feature data transmission code stream into visual feature data of the second protocol format.

9. The system for codec of visual feature data according to claim 8, wherein:

the encoder is further configured to delete at least one certificate identifier and at least one organization manner of the visual feature data of the first protocol format corresponding to the one or more certificate identifiers, or modify said at least one certificate identifier and said at least one organization manner of the visual feature data of the first protocol format.

10. The system for codec of visual feature data according to claim 8, further comprising:

the intelligent front end, configured to register the organization manner of the visual feature data of the first protocol format and its corresponding certificate identifier in the encoder.

11. The system for codec of visual feature data according to claim 8, further comprising:

a user back end, configured to perform search matching or identification on a set of feature descriptors contained in the original visual feature data having the same certificate identifier.

12. The system for codec of visual feature data according to claim 8, wherein the encoder comprises:

a data receiving module, configured to receive the visual feature data of the at least one type of first protocol format generated by the at least one type of intelligent front end, and the at least one certificate identifier configured to uniquely identify the corresponding at least one type of first protocol format;

a first-protocol-format specification determination module, configured to determine at least one organization manner of the visual feature data of the at least one first protocol format according to the at least one certificate identifier;

an original visual feature data extraction module, configured to extract at least one type of original visual feature data according to the at least one organization manner of the visual feature data of the at least one first protocol format; and a second-protocol-format visual feature data generation module, configured to encapsulate the at least one type of original visual feature data according to the organization manner of visual feature data of a second protocol format to generate visual feature data of the second protocol format.

* * * * *